United States Patent
Rahier et al.

(10) Patent No.: US 8,613,299 B2
(45) Date of Patent: Dec. 24, 2013

(54) TIRE WITH SIDEWALL REINFORCEMENT

(75) Inventors: Christophe B. Rahier, Saint-Genes-Champanelle (FR); Stéphane P. Callamand, Marsat (FR); Marc R. Favre, Clermont-Ferrand (FR); Jean-Michel C. Huyghe, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 509 days.

(21) Appl. No.: 11/921,449

(22) PCT Filed: Jun. 6, 2005

(86) PCT No.: PCT/US2005/019767
§ 371 (c)(1),
(2), (4) Date: Jan. 30, 2008

(87) PCT Pub. No.: WO2006/132631
PCT Pub. Date: Dec. 14, 2006

(65) Prior Publication Data
US 2008/0149249 A1     Jun. 26, 2008

(51) Int. Cl.
*B60C 9/00*     (2006.01)
*B60C 9/18*     (2006.01)
*B60C 15/00*    (2006.01)

(52) U.S. Cl.
USPC ........... 152/555; 152/526; 152/538; 152/539; 152/546

(58) Field of Classification Search
USPC .......................................... 152/555
See application file for complete search history.

(56) References Cited

U.S. PATENT DOCUMENTS

| | | | | |
|---|---|---|---|---|
| 3,435,875 A | * | 4/1969 | Devienne | 152/455 |
| 3,506,052 A | * | 4/1970 | Wittneben | 152/535 |
| 3,509,930 A | * | 5/1970 | Mirtain | 152/555 |
| 5,164,029 A | | 11/1992 | Oohashi et al. | |

FOREIGN PATENT DOCUMENTS

| | | | |
|---|---|---|---|
| GB | 2017016 | * | 9/1979 |
| GB | 2041841 | * | 9/1980 |
| JP | 62-88601 | | 4/1987 |
| JP | 6-255320 | | 9/1994 |
| JP | 7-179101 | | 7/1995 |

* cited by examiner

Primary Examiner — Justin Fischer
(74) Attorney, Agent, or Firm — Dickinson Wright PLLC

(57) ABSTRACT

A pneumatic tire having an impact resistant construction is provided. More specifically, a tire is provided that has increased resistance to travel conditions that can cause pinch shock. Reinforcements of a particular orientation are provided in portions of the tire where pinch shock typically occurs. A range of orientations for the cords used in such reinforcements is described.

5 Claims, 7 Drawing Sheets

TIRE WITH SIDEWALL REINFORCEMENT

TECHNICAL FIELD OF THE INVENTION

The present invention provides a pneumatic tire having a reinforced sidewall construction. More specifically, the present invention provides a tire that is resistant to travel conditions that can cause pinch shock. Reinforcements of a particular orientation are provided in portions of the tire where pinch shock typically occurs.

BACKGROUND OF THE INVENTION

As used here, pinch shock describes a tire condition that can result when the tread section of the tire is impacted in a manner that causes the shoulder section of the tire to contact the bead section. In such condition, the sidewall of the tire is buckled or folded over itself as the shoulder section makes contact with the bead section. During such pinching, the rubber mix and carcass layer of the tire composite structure are compressed between the rim and an obstacle or other feature in the travel path of the tire. Under certain conditions, such as a severe impact, the carcass layer cords may undergo an extension beyond their rupture strength. It has been observed that pinch shock often results in the cords being severed in two different places in the carcass layer—one within the shoulder section of the tire and one at the bead section. Such severing of the cords in the carcass layer is undesirable because the cords contribute to the structural integrity of the tire. Depending on the number of cords that are broken, the tire may show a deformation or a cut.

In general, poor road conditions or other factors causing severe impact on the tread section of the tire can be responsible for pinch shock. For example, unpaved or poorly paved roads may have a variety of holes or other sudden changes in elevation that can lead to pinch shock. Similarly, roads containing debris or other obstructions can cause pinch shock as the tire encounters such obstacles in the road. Accordingly, for road surfaces where conditions leading to severe pinching of the tire are anticipated or expected, a tire more resistant to the breaking of radial plies is desirable.

THE SUMMARY OF THE INVENTION

Various features and advantages of the invention will be set forth in part in the following description, or may be obvious from the description. The present invention provides a pneumatic tire that has increased resistance to pinch shock. Reinforcements of the tire are provided at particular locations and orientations to provide resistance to breakage of, for example, the carcass layer.

In one exemplary embodiment, a pneumatic tire for mounting upon a rim is provided that includes a tread portion for contacting a ground surface and a crown portion to support the tread portion. The crown portion is positioned radially-inward of the tread portion. A pair of sidewall portions are provided with each extending radially inward from an axial edge of the crown portion. Each sidewall portion defines a side of the tire. A pair of beads, each having a circumferentially-inextensible bead core and defining a bead core center are provided. Each bead is positioned radially-inward of a respective sidewall portion of the tire. A carcass layer extends through the crown portion and between the beads. The carcass layer has a pair of carcass layer ends with each end being wrapped around a respective bead. The carcass layer is constructed from a plurality of radially-oriented carcass layer cords.

At least one crown ply is located radially-inward of the tread portion and is positioned radially-outward of the carcass layer. The crown ply extends between the sides of the tire. A pair of reinforcement plies is provided. Each individual reinforcement ply is positioned on a side of the tire and extends from a respective sidewall portion to a position radially-inward of the crown ply. Each reinforcement ply extends by a predetermined distance d from an axial edge of the crown ply. The reinforcement plies are constructed from a plurality of reinforcement ply cords. The reinforcement ply cords are oriented at a predetermined angle of between about 0 to 20 degrees with respect to the carcass layer cords. In certain embodiments, the reinforcement ply cords are substantially parallel with the carcass layer cords.

Numerous other exemplary embodiments of the present invention are provided. By way of example, a tire can be constructed as above and where the predetermined distance d is greater than about 10 mm. A pair of bead fillers can be provided, one each located within the beads of the tire. In such exemplary embodiment, each bead filler separates the carcass layer from the carcass layer end, and each of the bead fillers extends radially a predetermined distance $h_f$ from a respective bead center. For certain embodiments, predetermined distance $h_f$ is preferably greater than about 30 mm.

By way of further example, the pneumatic tire may also include, for each said side of the tire, carcass layer ends that extend through a respective sidewall portion to a position that is between a respective reinforcement ply and the crown ply. Each carcass layer end extends a predetermined distance d' from a respective axial edge of the crown ply. For certain embodiments, it is preferred that the absolute value of the difference between the predetermined distances d and d' is greater than about 5 mm. In still other embodiments, predetermined distance d' is preferably greater than about 10 mm.

Additionally, as an alternative to the extended carcass layer ends, a pair of second reinforcement plies, one located on each side of the tire, can be provided. Each such second reinforcement ply extends from a respective bead portion to a position that is between the previously described reinforcement ply and the crown ply. Each of the second reinforcement plies are constructed to extend a predetermined distance d' from a respective axial edge of the crown ply. For certain embodiments, preferably the absolute value of the difference between the predetermined distances d and d' is greater than about 5 mm. In still other embodiments, predetermined distance d' is greater than about 10 mm. In other alternative embodiments of the present invention, the reinforcement ply extends into a respective sidewall portion by a predetermined distance f from an axial edge of the crown ply with predetermined distance f being at least about 25 mm. By way of further example, with the tire defining an equator, the predetermined distance f may be between about 25 mm and an amount by which the reinforcement ply would extend into the respective sidewall portion up to about the equator of the tire.

Finally, as another example of the embodiments of the present invention, the pneumatic tire can be constructed such that each respective reinforcement ply overlaps with a respective carcass layer end in a respective sidewall portion by an amount between about 5 mm to 30 mm. Alternatively, the pneumatic tire can be constructed such that each reinforcement ply begins in a respective bead and extends through a respective sidewall portion to a position that is radially-inward of the crown ply.

The carcass layer cords and reinforcement ply cord of any of the previously described embodiments is preferably constructed from textile materials such as polyester, nylon, aramide, rayon, or an association of these textile materials.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Repeat use of identical or similar reference characters throughout the present specification and appended drawings is intended to represent same or analogous features or elements of the invention.

DETAILED DESCRIPTION

Reference will now be made in detail to embodiments of the invention, one or more examples of which are illustrated in the figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments are depicted in the figures. One of ordinary skill in the art, using the teachings disclosed herein, will understand that the same or substantially similar features are repeated on both sides of the tire.

Figure 1:
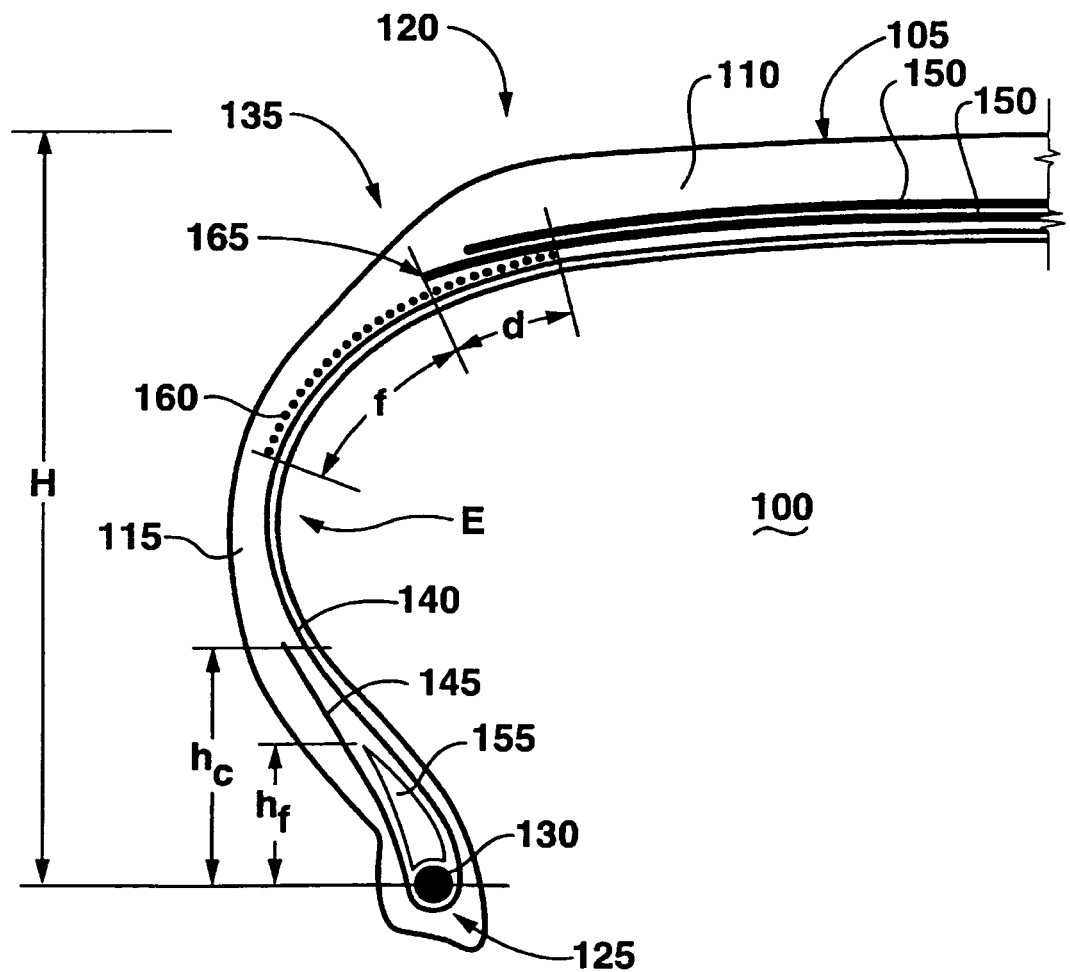
FIG. 1 is a partial sectional view of an exemplary embodiment of a pneumatic tire according to the present invention.

Referring now to FIG. 1, a pneumatic radial tire 100 is provided having features, as will now be further described, for providing increased resistance to pinch shock under certain adverse travel conditions as discussed above. Tire 100 has a tread portion 105 for contacting the road surface. Tread portion 105 is supported by a crown portion 110 that is positioned radially-inward of tread portion 105. Sidewall portion 115 extends in a direction radially-inward from axial edge 120 of crown portion 110. Tire bead 125 is located radially-inward of sidewall portion 115 and includes a circumferentially-inextensible bead core 130. Although depicted as a single element, bead core 130 typically includes a bundle of metallic strands oriented circumferentially through bead 125. One of ordinary skill in the art will understand, using the teaching disclosed herein, that the present invention is not limited to the precise shape of bead 125, tread portion 105, or tire 100 as depicted in FIGS. 1-4. Other embodiments for mounting on a variety of differently sized and shaped rims fall within the scope of the present invention.

In order to provide increased resistance to pinch shock, tire 100 includes reinforcements within shoulder portion 135 as will now be described. A carcass layer 140 is provided that extends between the beads 125 of tire 100 and terminates in a pair of carcass layer ends 145. Each carcass layer end 145 is formed by wrapping carcass layer 140 around a bead core 130 and then terminating ply 140 after extending it for a predetermined distance in a radially-outward direction along sidewall portion 115. Carcass layer 140 extends through crown portion 100 at a position that is radially-inward of crown plies 150. A bead filler 155 is positioned radially-outward of each bead 130 and separates carcass layer 140 from carcass layer end 145. Bead filler 155 has a predetermined height $h_f$ as measured from the center of bead core 130 in a manner perpendicular to the axial direction of tire 100. Carcass layer end 145 has predetermined height $h_c$ as measured from the center of bead core 130 in a manner perpendicular to the axial direction of tire 100. For the particular embodiment of the invention illustrated in FIG. 1, predetermined height $h_c$ is at least 55 percent of the nominal tire sidewall height H (which will be understood by one of ordinary skill in the art to be the product of the tire aspect ratio multiplied by the section width of the tire). However, other considerations such as the process of manufacture or tire performance considerations other than pinch shock may require a different value for predetermined height $h_c$.

Typically, carcass layer 140 is constructed from a plurality of textile cords made from materials such as polyester, nylon, aramide, rayon, or an association of these textile materials. These cords are typically arranged in a radial direction along the sidewall portions 115 of tire 100. More specifically, along the sidewall portions of tire 100, the cords of carcass layer 140 are substantially perpendicular to the axis of rotation of tire 100.

Additionally, tire 100 is provided with a pair of reinforcement plies 160—one on each side of tire 100 and located in shoulder portions 135. As depicted in FIG. 1, each reinforcement ply 160 extends from sidewall portion 115 to a position radially-inward of crown plies 150. Reinforcement plies 160 are shown in FIG. 1 at a position located radially-outward of carcass layer 140; however, it should be understood that positioning reinforcement plies 160 radially-inward of carcass layer 140 is within the spirit and scope of the present invention. Reinforcement ply 160 extends a predetermined distance d towards crown portion 110 and past the axial edge 165 of the radially-innermost crown ply 150. Preferably, predetermined distance d is greater than about 10 mm but could be longer depending upon other considerations such as the process of manufacture or tire performance considerations other than pinch shock. Reinforcement ply 160 also extends a predetermined distance f towards sidewall portion 115 and past the axial edge 165 of the radially-innermost crown ply 150. Preferably, predetermined distance f is at least 25 mm but could be longer depending upon other considerations such as the process of manufacture or tire performance considerations other than pinch shock. In still other embodiments of the present invention, distance f is at least 25 mm in length but does not exceed a length that would extend reinforcement ply 160 past tire equator E. As with carcass layer 140, reinforcement plies 160 are typically constructed from a plurality of textile cords made from materials such as polyester, nylon, aramide, rayon, or an association of these textile materials. As with carcass layer end 145, reinforcement ply 160 provides additional reinforcement to resist breakage—or pinch shock—within tire 100 when pinching between the rim and road surface occurs.

Using methods of finite element analysis, applicants studied the impact on pinch shock resistance of varying the angle of cords in reinforcement ply 160 relative to the cords in carcass layer 140. The rubber-based materials typically used in tire construction are virtually incompressible. As a result, when these materials are pinched, such as between the rim and the road surface during conditions conducive to pinch shock, the rubber expands in directions largely perpendicular to the forces causing the pinch. Depending upon the amount of displacement, the cords within the tire can be broken—referred to herein as pinch shock. Applicants have determined that by orienting the cords of reinforcement ply 160 in a manner that is substantially parallel to carcass layer 140, maximum effect is provided for reinforcing tire 100 and increasing its resistance to pinch shock. However, this parallel orientation may be less desirable for certain applications—such as applications desiring increased lateral stability. Accordingly, applicants have determined that angles other than a parallel orientation between the cords of the carcass layer 140 and reinforcement ply 160 may be used while still providing a tire construction resistant to pinch shock.

Figure 7:
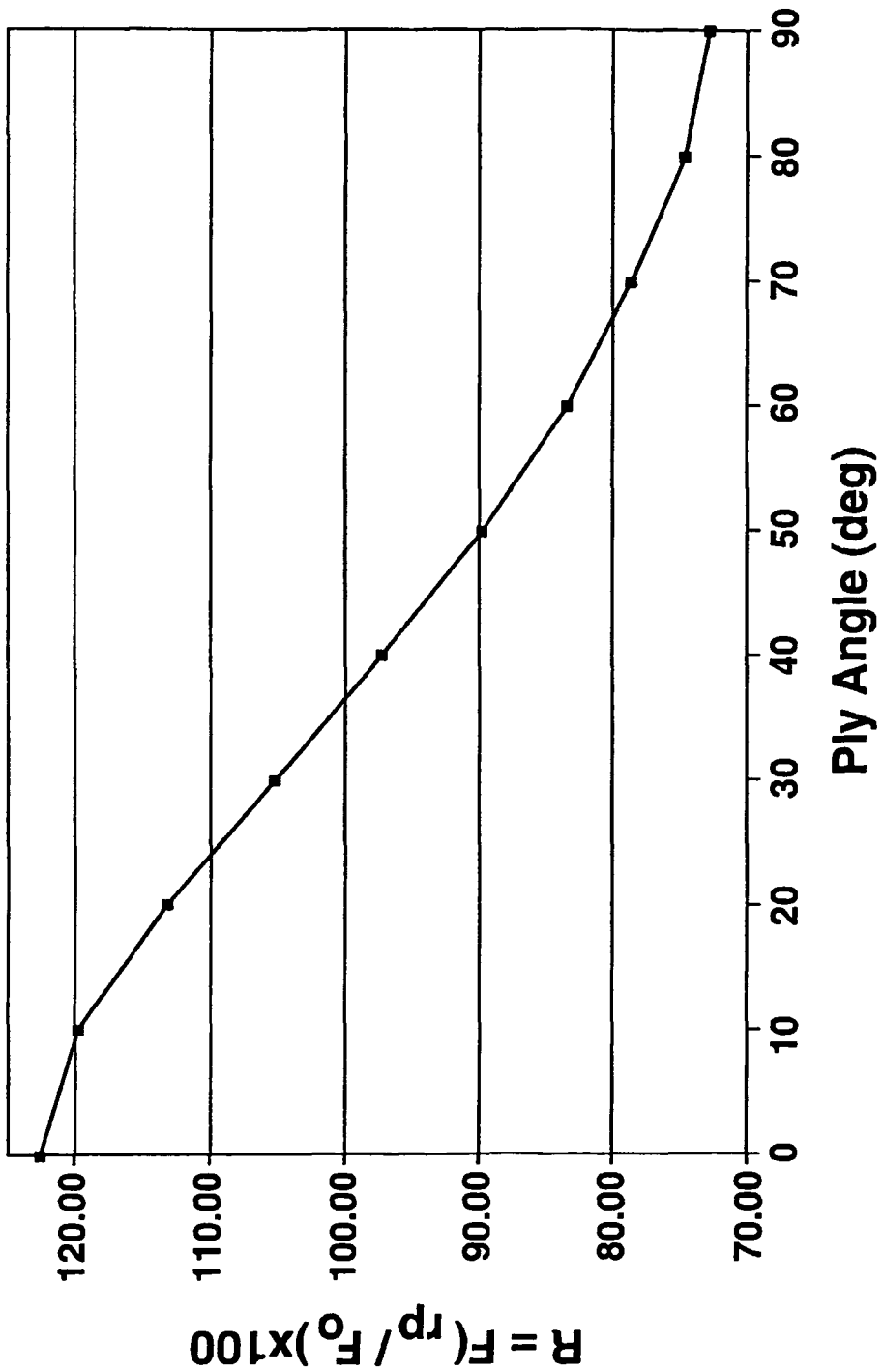
FIG. 7 is a plot of certain data as explained herein.

Referring now to the chart shown in FIG. 7, the x-axis indicates the angle of the cords making up the reinforcement ply 160 relative to a horizontal plane passing through the axis of rotation of tire 100. For example, an angle of 90 degrees would represent cords in the reinforcement ply that are perpendicular to a horizontal plane passing through the axis of rotation of tire 100. In such orientation, the cords of carcass layer 140 and reinforcement ply 160 are substantially parallel to one another. The y-axis of the chart in FIG. 7 represents the ratio of forces within a specific portion of the tire that was subjected to finite element analysis. This specific portion was chosen from a position within shoulder portion 135 of tire 100 where the effects of pinch shock are typically expected to occur. The ratio indicated on the y-axis is:

$$R=(F_{rp}/F_0)*100$$

where $F_{rp}$=tensile force experienced with a reinforcement ply
$F_0$=tensile force experienced without a reinforcement ply To minimize the tensile forces leading to pinch shock, it is desirable that R be reduced or minimized. As shown in the chart of FIG. 7, R is minimized when the cords of the reinforcement ply 160 have an angle of 90 degrees relative to a horizontal plane passing through the axis of rotation of the tire 100. Stated alternatively, R is minimized when the cords of the reinforcement ply 160 are parallel with the cords making up carcass layer 140. However, as shown in FIG. 7, applicants determined that reinforcement ply 160 still provides an acceptable resistance against pinch shock at an angle of between about 70 to 90 degrees (i.e. 0 to 20 degrees relative to the carcass layer cords). While some efficacy is still achieved at angles below about 70 degrees, the cost of providing reinforcement ply 160 begins to outweigh the benefits of resisting pinch shock as the angle decreases from about 70 degrees. Accordingly, where angles of less than 90 degrees are preferred—perhaps for applications where increased lateral stability is desirable—applicants have discovered that resistance to pinch shock can still be achieved with the present invention.

Figure 2:
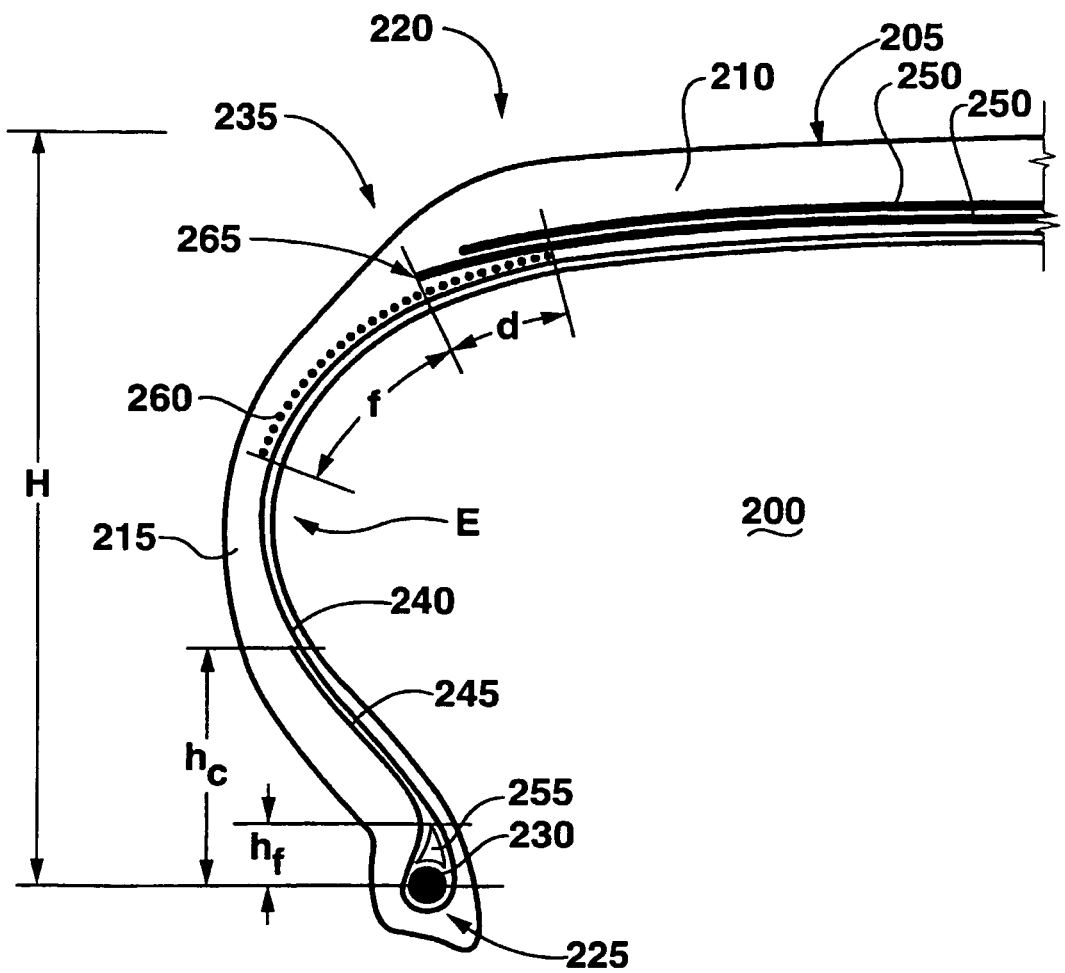
FIG. 2 is a partial sectional view of another exemplary embodiment of a pneumatic tire according to the present invention.

FIG. 2 illustrates another exemplary embodiment of a tire 200 according to the present invention. Tire 200 is similar in all respects to tire 100 depicted in FIG. 1, except predetermined distance $h_f$ of bead filler 255 is substantially smaller. In this embodiment, at least a portion of the carcass layer end 245 follows a path in alignment with the path of the carcass layer 240. Preferably, the carcass layer end 245 follows the carcass layer for radial positions greater than the radial extent $h_f$ of the bead filler. By reducing the volume of bead filler 255, an increased local strength of carcass layer 240 is achieved in bead 225. Preferably, $h_f$ is about 20 mm. Predetermined distance $h_c$ should be at least 30 mm but could be longer depending upon other considerations such as the process of manufacture or performance considerations other than pinch shock. For yet other embodiments of the present invention, $h_c$ can have a value of between at least about 30 mm and an amount no greater than that which would extend carcass layer end 245 past equator E. In a manner previously described, tire 200 includes a pair of reinforcement plies 260, one in each shoulder portion 235 of tire 200, and also includes a carcass layer 240 that is wrapped around bead core 230 to provide carcass layer end 245. Reinforcement plies 260 are shown in FIG. 2 at a position located radially-outward of carcass layer 240; however, it should be understood that positioning reinforcement plies 260 radially-inward of carcass layer 240 is within the spirit and scope of the present invention as well. As previously described, the angle of the cords in reinforcement ply 260 relative to the cords in carcass layer 240 is between about 0 and 20 degrees. Stated alternatively, the angle of the cords in reinforcement ply 260 relative to a horizontal plane passing through the axis of rotation of tire 200 is between about 70 to 90 degrees. Also, reinforcement ply 260 extends a predetermined distance f towards sidewall portion 215 and past the axial edge 265 of the radially-innermost crown ply 250. Preferably, predetermined distance f is at least 25 mm but could be longer depending upon other considerations such as the process of manufacture or tire performance considerations other than pinch shock. In certain embodiments, distance f is at least 25 mm but does extend reinforcement ply 260 past tire equator E.

Figure 3:
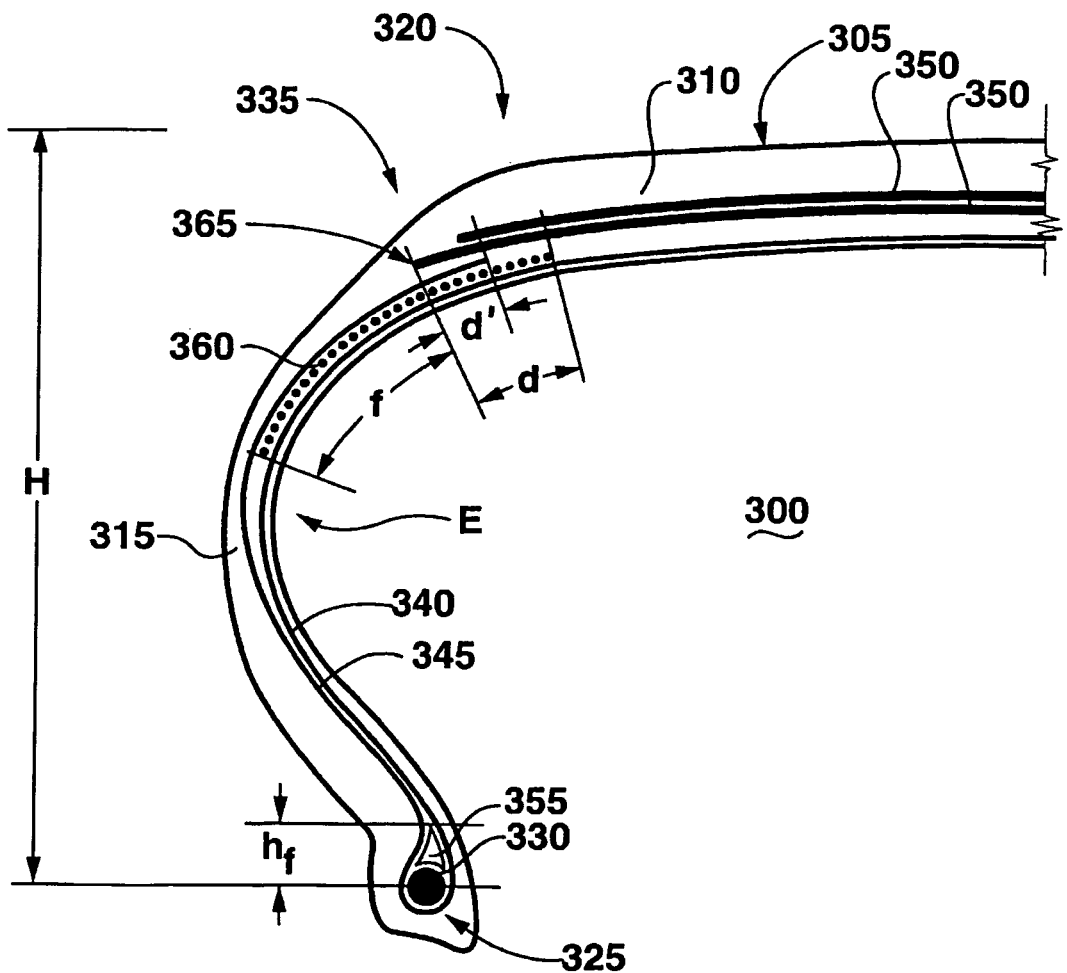
FIG. 3 is a partial sectional view of another exemplary embodiment of a pneumatic tire according to the present invention.

Another embodiment of a tire 300 according to the present invention is depicted in FIG. 3. Tire 300 includes a carcass layer 340 that wraps around bead core 330. However, rather than terminating in sidewall portion 315, carcass layer end 345 extends up through sidewall portion 315 and into shoulder portion 335. More specifically, carcass layer end 345 extends past the axial edge 365 of crown ply 350 by a predetermined distance d'. Preferably, d' is greater than about 10 mm. Carcass layer end 345 is located between crown ply 350 and reinforcement ply 360. In a manner previously described, tire 300 includes a pair of reinforcement plies 360. Reinforcement plies 360 are shown in FIG. 3 at a position located radially-outward of carcass layer 340; however, it should be understood that reinforcement plies 360 may be positioned radially-inward of carcass layer 340 as well. Each reinforcement ply 360 extends through shoulder portion 335 and past axial edge 365 by a predetermined distance d. Preferably, the absolute value of the difference between d and d' is greater than about 5 mm. Although the embodiments of FIGS. 3 (& 4) show added ply 360 embedded between 340 and 345, 360 can be in any position, interior or exterior. This is true for all embodiments of the present invention.

Collectively, carcass layer 340, carcass layer end 345, and reinforcement ply 360 provide a triple layer of reinforcement in shoulder portion 335 of tire 300 and a double layer of protection at bead 330. Similar to the previously described embodiments, carcass layer 340 is constructed from a plurality of cords oriented in the radial direction or at an angle of 90 degrees with respect to a horizontal plane passing though the axis of rotation of tire 300. By orienting the cords making up reinforcement ply 360 at an angle of between about 0 to 20 degrees relative to the cords in carcass layer 340, the resistance of tire 300 to pinch shock is increased—with an angle of about 0 degrees being optimal. This feature can be combined with a reduced volume of bead filler 355 to provide an increased local strength of carcass layer 340 at bead 330. Additionally, the durability of bead 330 is increased by the reduction of both the predetermined distance $h_f$ (relative to, for example, the exemplary embodiment of FIG. 1) and thickness of bead filler 355. In addition, reinforcement ply 360 extends a predetermined distance f towards sidewall portion 315 and past the axial edge 365 of the radially-innermost crown ply 350. Preferably, predetermined distance f is at least 25 mm but could be longer depending upon other considerations such as the process of manufacture or tire performance considerations other than pinch shock. In certain embodiments, distance f is at least 25 mm but does extend reinforcement ply 360 past tire equator E.

Figure 4:
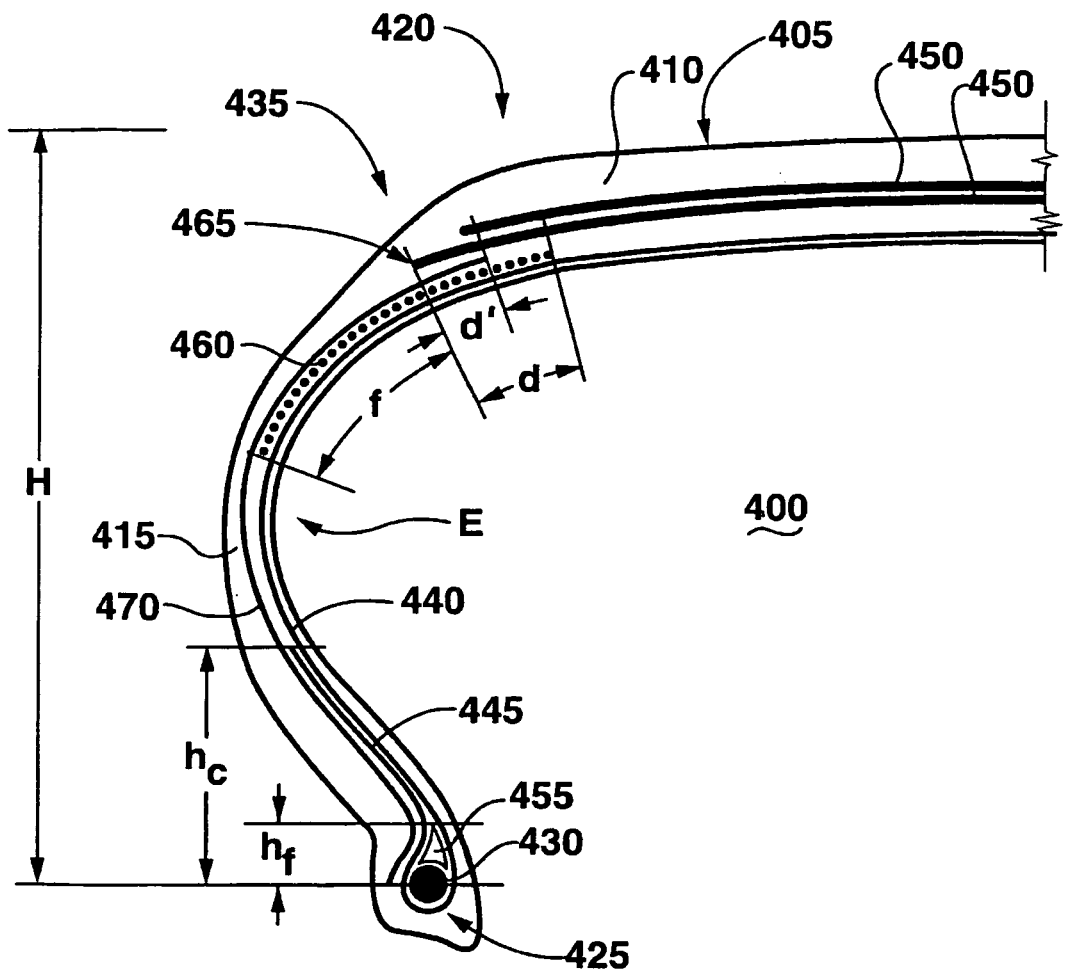
FIG. 4 is a partial sectional view of another exemplary embodiment of a pneumatic tire according to the present invention.

Referring now to FIG. 4, another embodiment of a tire 400 according to the present invention is provided. Tire 400 includes a carcass layer 440 that wraps around bead core 430 and terminates in sidewall portion 415. A first reinforcement ply 460 extends through shoulder portion 435 and past axial edge 465 by a predetermined distance d. As described with previous embodiments, reinforcement ply 460 is shown in FIG. 4 at a position located radially-outward of carcass layer 440; however, it should be understood that positioning reinforcement plies 460 radially-inward of carcass layer 440 is within the spirit and scope of the present invention. A second reinforcement ply 470 begins in bead 425, extends through sidewall portion 415, and into shoulder portion 435. Second reinforcement ply 470 extends past the axial edge 465 of crown ply 450 by a predetermined distance d'. Preferably, d' is greater than about 10 mm. Second reinforcement ply 470 is located between crown ply 450 and reinforcement ply 460. Preferably, the absolute value of the difference between d and d' is greater than about 5 mm.

Carcass layer 440, first reinforcement ply 460 and second reinforcement ply 470 provide a triple layer of reinforcement in shoulder portion 435 of tire 400 and a triple layer of protection at bead 430. As with the previously described embodiments, carcass layer 440 is constructed from a plurality of cords oriented in the radial direction or at an angle of 90 degrees with respect to a horizontal plane passing though the axis of rotation. By orienting the cords making up first reinforcement ply 460 at an angle of between about 0 to 20 degrees relative to the cords in carcass layer 440, the resistance of tire 400 to pinch shock is increased—with an angle of about 0 degrees being optimal. This feature can be combined with a reduced volume of bead filler 455 to provide an increased local strength of carcass layer 440 at bead 430. Additionally, the durability of bead 430 is increased by the reduction of both the predetermined distance $h_f$ (relative to, for example, the exemplary embodiment of FIG. 1) and thickness of bead filler 455. Finally, reinforcement ply 460 extends a predetermined distance f towards sidewall portion 415 and past the axial edge 465 of the radially-innermost crown ply 450. Preferably, predetermined distance f is at least 25 mm but could be longer depending upon other considerations such as the process of manufacture or tire performance considerations other than pinch shock. In certain embodiments, distance f is at least 25 mm but does extend reinforcement ply 460 past tire equator E.

Figure 5:
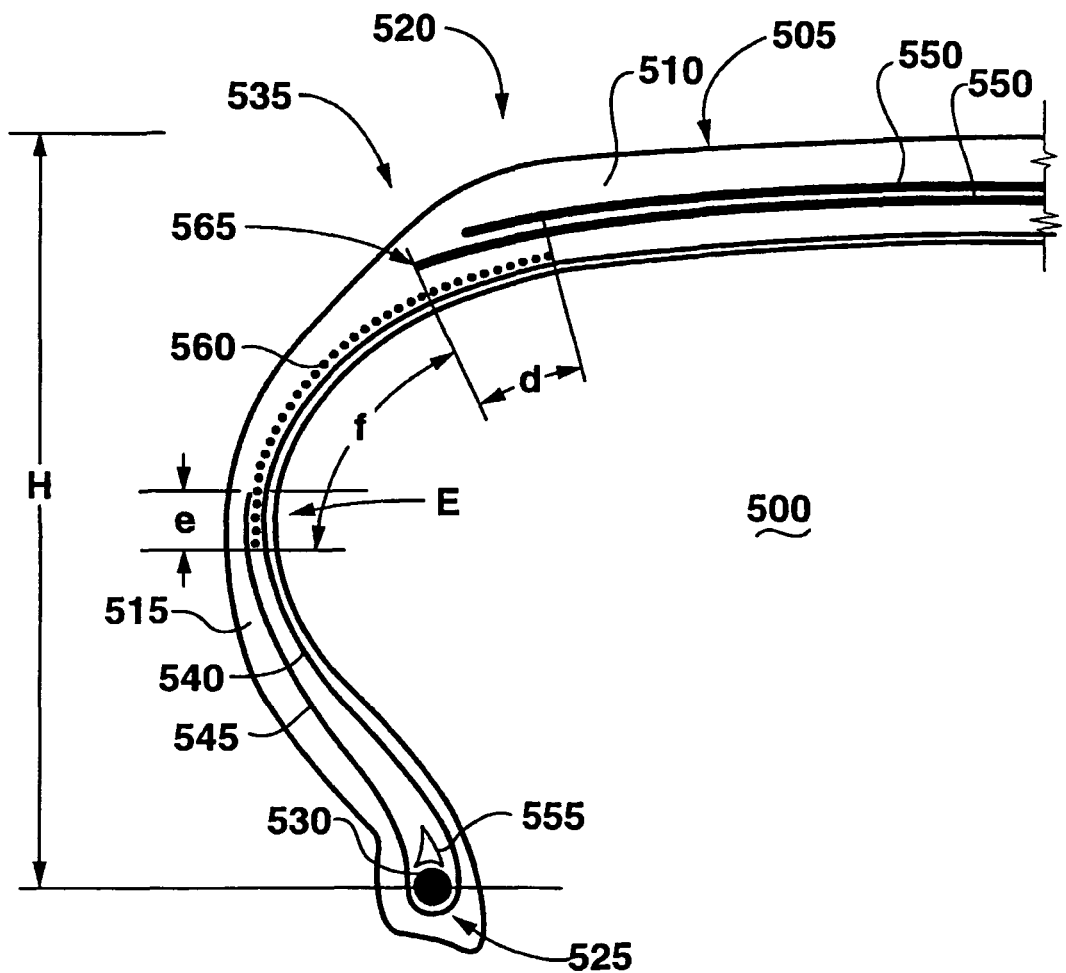
FIG. 5 is a partial sectional view of another exemplary embodiment of a pneumatic tire according to the present invention.

FIG. 5 illustrates another exemplary embodiment of a tire 500 according to the present invention. In a manner previously described, tire 500 includes a pair of reinforcement plies 560, one in each shoulder portion 535 of tire 500, and also includes a carcass layer 540 that is wrapped around bead core 530 to provide carcass layer end 545. Reinforcement plies 560 are shown in FIG. 5 at a position located radially-outward of carcass layer 540; however, it should be understood that positioning reinforcement plies 560 radially-inward of carcass layer 540 is within the spirit and scope of the present invention as well. As previously described, the angle of the cords in reinforcement ply 560 relative to the cords in carcass layer 540 is between about 0 and 20 degrees. Stated alternatively, the angle of the cords in reinforcement ply 560 relative to a horizontal plane passing through the axis of rotation of tire 500 is between about 70 to 90 degrees. Also, reinforcement ply 560 extends a predetermined distance f into sidewall portion 515 and extends past the axial edge 565 of the radially-innermost crown ply 550 by a predetermined distance d. For this embodiment of the present invention, each respective reinforcement ply 560 overlaps with a respective carcass ply end 545 by a distance e. The amount of overlap should be between about 5 mm and 30 mm.

Figure 6:
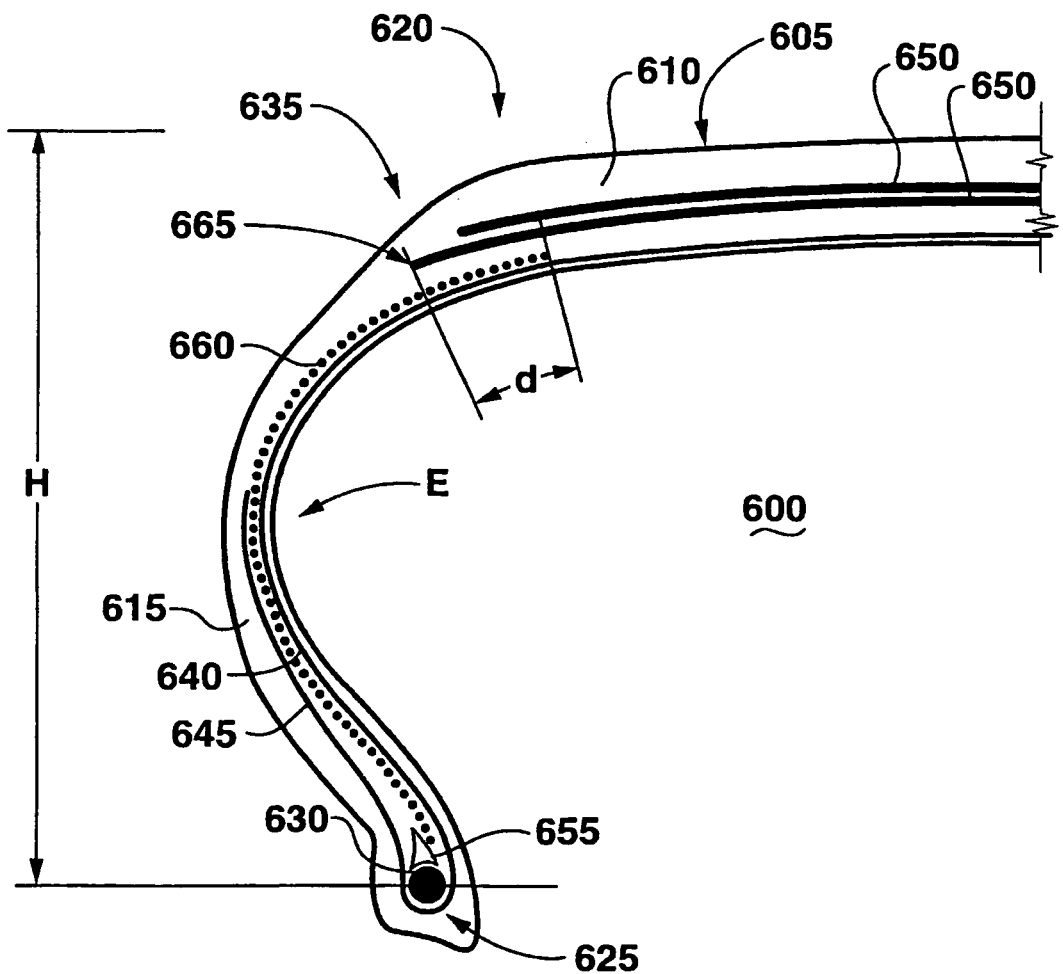
FIG. 6 is a partial sectional view of another exemplary embodiment of a pneumatic tire according to the present invention.

FIG. 6 illustrates an exemplary embodiment of a tire 600 according to the present invention. In a manner previously described, tire 600 includes a pair of reinforcement plies 660, one in each shoulder portion 635 of tire 600, and also includes a carcass layer 640 that is wrapped around bead core 630 to provide carcass layer end 645. Reinforcement plies 660 are shown in FIG. 6 at a position located radially-outward of carcass layer 640; however, it should be understood that positioning reinforcement plies 660 radially-inward of carcass layer 640 is within the spirit and scope of the present invention as well. As previously described, the angle of the cords in reinforcement ply 660 relative to the cords in carcass layer 640 is between about 0 and 20 degrees. Stated alternatively, the angle of the cords in reinforcement ply 660 relative to a horizontal plane passing through the axis of rotation of tire 600 is between about 70 to 90 degrees. Also, reinforcement ply 660 extends a predetermined distance d past the axial edge 665 of the radially-innermost crown ply 650. Each respective reinforcement ply 660 also extends through a respective sidewall portion 615 to a respective bead 625. As such, reinforcement plies 660 provide reinforcement to the shoulder portion 635 and bead 625 at the same time.

It should be understood that the present invention includes various modifications that can be made to the exemplary embodiments of apparatus and method described herein that come within the scope of the appended claims and their equivalents.

What is claimed is:

1. A pneumatic tire for mounting upon a rim, comprising:
   a tread portion for contacting a ground surface;
   a crown portion to support said tread portion, said crown portion positioned radially-inward of said tread portion;
   a pair of sidewall portions each extending radially inward from an axial edge of said crown portion, each said sidewall portion defining a side of the tire;
   a pair of beads, each said bead having a circumferentially-inextensible bead core defining a bead core center, each said bead positioned radially-inward of a respective said sidewall portion;
   a carcass layer constructed from a plurality of radially-oriented carcass layer cords, and extending through said crown portion and between said beads, said carcass layer having a pair of carcass layer ends with each said carcass layer end being anchored in a respective said bead, each carcass layer end extending radially outward from a respective bead core center by a distance $h_c$, this distance $h_c$ being less than an amount that would extend the carcass layer end radially past a tire equator, a portion of said carcass layer end following a path in alignment with the carcass layer and said carcass layer being constructed from a plurality of radially-oriented carcass layer cords;

at least one crown ply located radially-inward of said tread portion, positioned radially-outward of said carcass layer, and extending between said sidewall portions of the tire; and a pair of reinforcement plies, one located on each said sidewall portions of the tire, each said reinforcement ply extending from a respective said sidewall portion to a position radially-inward of said crown ply by a predetermined distance d from an axial edge of said crown ply, said reinforcement ply being constructed from a plurality of reinforcement ply cords, said reinforcement ply being located radially-outward of the carcass layer;

wherein said reinforcement ply cords are oriented parallel to said carcass layer cords and wherein each reinforcement ply overlaps with a carcass layer end in a sidewall portion, said reinforcement ply extending in to a respective side wall portion by a distance f such that each said reinforcement ply terminates at a distance of no more than about 5 to about 30 mm from the equator such that the termination of each of said reinforcement plies is disposed between said respective carcass layer and said respective carcass layer end.

2. The pneumatic tire as in claim 1, wherein said distance f is at least about 25 mm.

3. The pneumatic tire as in claim 1, wherein said predetermined distance d is greater than about 10 mm.

4. A pneumatic tire as in claim 1, wherein each said reinforcement ply overlaps with the respective said carcass layer end in the respective said sidewall portion by an amount between about 5 mm to 30 mm.

5. The pneumatic tire as in claim 1, wherein the distance $h_c$ is at least about 30 mm.

* * * * *